(12) United States Patent
Fauth

(10) Patent No.: US 9,193,016 B2
(45) Date of Patent: Nov. 24, 2015

(54) SLIDE TOOL AND BRAKE DISK

(71) Applicant: Andreas Fauth, Stuttgart (DE)

(72) Inventor: Andreas Fauth, Stuttgart (DE)

(73) Assignee: Daimler AG, Stuttgart (DE)

( * ) Notice: Subject to any disclaimer, the term of this patent is extended or adjusted under 35 U.S.C. 154(b) by 81 days.

(21) Appl. No.: 14/355,235

(22) PCT Filed: Nov. 6, 2012

(86) PCT No.: PCT/EP2012/004613
§ 371 (c)(1),
(2) Date: Apr. 30, 2014

(87) PCT Pub. No.: WO2013/072025
PCT Pub. Date: May 23, 2013

(65) Prior Publication Data
US 2014/0298637 A1   Oct. 9, 2014

(30) Foreign Application Priority Data

Nov. 19, 2011   (DE) .......................... 10 2011 118 985

(51) Int. Cl.
*B23P 11/00*       (2006.01)
*F16D 65/12*       (2006.01)
(Continued)

(52) U.S. Cl.
CPC .............. *B23P 11/005* (2013.01); *F16D 65/123* (2013.01); *B23P 2700/50* (2013.01); *F16D 2055/0004* (2013.01); *F16D 2065/13* (2013.01); *F16D 2065/1304* (2013.01);
(Continued)

(58) Field of Classification Search
CPC .. B23P 11/005; B23P 2700/50; F16D 65/123; F16D 2250/00; F16D 2250/0092; F16D 2065/1316; F16D 2065/13; F16D 2065/1304; F16D 2055/004; Y10T 29/49945; Y10T 29/49826
USPC ........... 29/525, 505, 428; 188/218 XL, 218 R
See application file for complete search history.

(56) References Cited

U.S. PATENT DOCUMENTS

| | | | | |
|---|---|---|---|---|
| 6,035,978 A | * | 3/2000 | Metzen | ................. F16D 65/123 188/218 XL |
| 7,464,452 B2 | * | 12/2008 | Yamamoto | ............. B21J 15/046 29/505 |
| 2003/0029219 A1 | * | 2/2003 | Rispler | .................. B21K 25/00 72/462 |

(Continued)

FOREIGN PATENT DOCUMENTS

| | | | | |
|---|---|---|---|---|
| DE | | 3421764 A1 | 12/1985 | |
| DE | | 3421764 C2 | * 11/1993 | ............ F16D 55/227 |

(Continued)

OTHER PUBLICATIONS

International Search Report dated Feb. 15, 2013, in International Application No. PCT/EP2012/004613, with English language translation.

*Primary Examiner* — Jermie Cozart
*Assistant Examiner* — Bayan Salone
(74) *Attorney, Agent, or Firm* — Patent Central LLC; Stephan A. Pendorf

(57) ABSTRACT

The invention relates to a slide tool, in particular for press-fitting or crimping a friction ring of a brake disc with a pot of the brake disc. The invention furthermore relates to a brake disc, in particular of a motor vehicle, having a pot, which has a floor and a wall that protrudes from and encloses it, and having a friction ring, which has an opening in which the wall is arranged.

2 Claims, 5 Drawing Sheets

Figure 1:
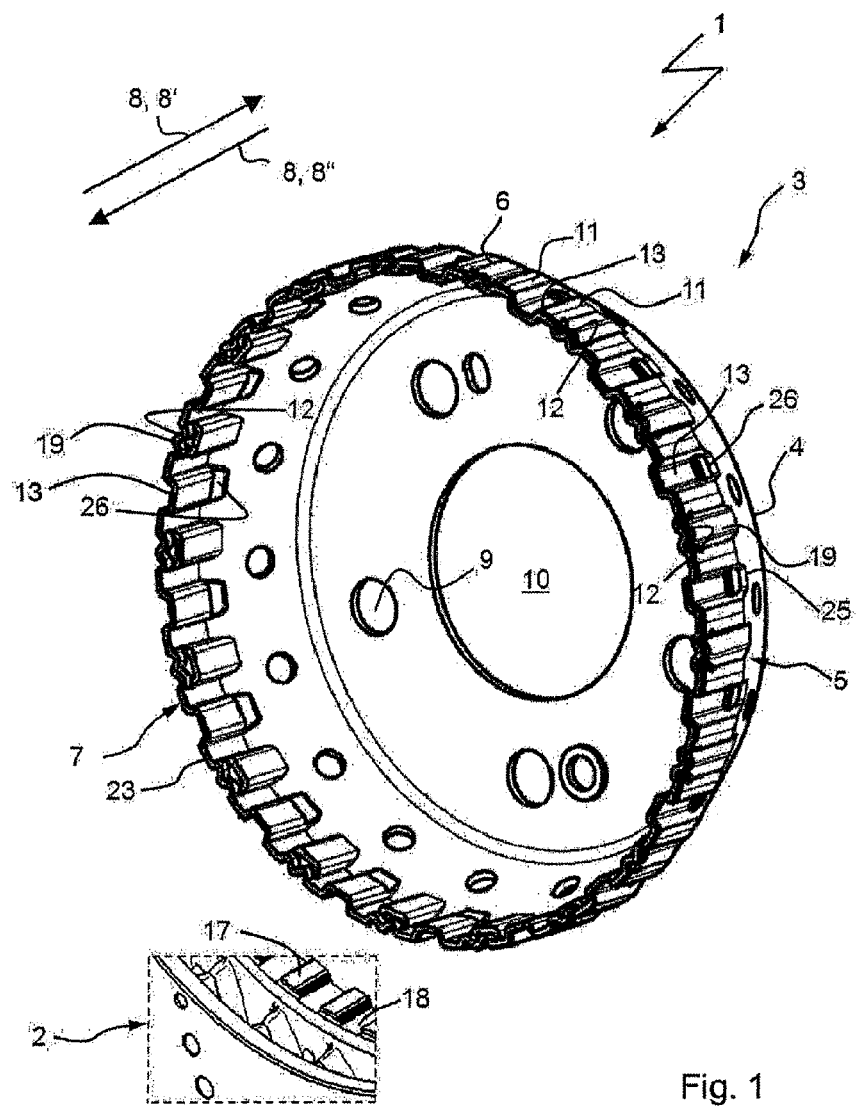

(51) Int. Cl.
*F16D 55/00* (2006.01)
*F16D 65/02* (2006.01)

(52) U.S. Cl.
CPC .... *F16D 2065/1316* (2013.01); *F16D 2250/00* (2013.01); *F16D 2250/0092* (2013.01); *Y10T 29/49945* (2015.01)

(56) References Cited

U.S. PATENT DOCUMENTS

| | | | | |
|---|---|---|---|---|
| 2003/0115755 | A1* | 6/2003 | Frantzen | B23P 11/005 29/898.064 |
| 2006/0080821 | A1* | 4/2006 | Yamamoto | B21J 15/046 29/428 |
| 2011/0012420 | A1* | 1/2011 | Nakagawa | B60B 27/0005 301/110 |
| 2012/0085603 | A1* | 4/2012 | Mayer | F16D 65/123 188/218 XL |

FOREIGN PATENT DOCUMENTS

| | | | | |
|---|---|---|---|---|
| DE | 4419757 | A1 * | 12/1995 | ............ F16D 65/123 |
| DE | 19652793 | A1 * | 6/1998 | ............ B21D 39/06 |
| DE | 10044897 | A1 * | 3/2002 | ............ B21K 25/00 |
| DE | 10150613 | A1 | 4/2003 | |
| DE | 20308038 | U1 | 7/2003 | |
| DE | 60025300 | T2 | 9/2006 | |
| DE | 102009007330 | A1 * | 8/2010 | ........ F16D 55/22655 |
| DE | 102009012216 | A1 * | 9/2010 | ............ F16D 65/123 |
| DE | 102009012217 | A1 | 9/2010 | |
| DE | 112009000811 | T5 | 5/2011 | |
| DE | WO 2011085749 | A1 * | 7/2011 | ............ F16D 65/128 |
| DE | 102010026728 | A1 * | 1/2012 | ............ F16D 65/123 |
| DE | 102010053579 | A1 * | 6/2012 | ............ B23P 11/00 |
| DE | 102011118985 | A1 * | 5/2013 | ............ F16D 65/123 |
| GB | 2160268 | A * | 12/1985 | ............ F16D 55/227 |
| JP | 60025300 | T2 * | 9/2006 | ............ B21J 15/046 |
| WO | 2011085749 | A1 | 7/2011 | |

\* cited by examiner

SLIDE TOOL AND BRAKE DISK

The invention relates to a slide tool, in particular for press-fitting a friction ring of a brake disc with a pot of the brake disc, comprising a main section and an extension section arranged on the main section.

The invention furthermore relates to a brake disc, in particular of a motor vehicle, having a pot, which has a floor and a wall that protrudes from and encloses it, and having a friction ring, which has an opening in which the wall is arranged.

The term pot can also be understood as the configuration of a wheel flange.

The pot and the friction ring are arranged concentrically, the wall has an axial pot gearing system running along an outer periphery, said system having pot teeth protruding radially outwards, and a respective pot tooth space is arranged in the peripheral direction between adjacent pot teeth. The friction ring has an axial annular gearing system running along an inner periphery, said system being designed to complement the pot gearing system and having annular teeth protruding radially inwards. A respective annular tooth space is arranged in the peripheral direction between adjacent annular teeth. The pot teeth engage with the annular tooth spaces and the annular teeth engage with the pot tooth spaces. A flap is moulded on at least one first pot tooth space, said flap protruding radially outwards and radially overlapping the respective annular tooth, which engages with this pot tooth space, on a first axial end.

So-called composite brake discs, i.e. brake discs whose friction ring and brake disc pots consist of different materials, are commonly known. An example of this is described in DE 4 419 757 A1. Composite brake discs are being used more and more, since the so-called parts can each be optimised separately in terms of their use due to the separation of brake disc pot and friction ring.

It is furthermore known from the prior art to apply a positive engagement element, for example in the form of a gearing system, to the brake disc pot, which engages with a complementary gearing system of the friction ring. For the axial fastening, flaps are to be applied to the pot, which are bent for the axial fastening against the friction ring.

When the flaps are bent, this can lead to problems, since there is always a certain amount of elastic recovery. Therefore, a certain level of clearance is always necessarily present between the flaps and the friction ring, for example in the form of a gap. During the bending, it can additionally lead to a partial tearing of the flaps, which compromises the durability of the finished brake disc.

Therefore, a first object of the present invention is to provide a method, by means of which, in a simple manner, a positive connection between the friction ring and pot of a brake disc can be ensured for the purposes of axial securing.

The specifications cited above are solved by a brake disc having the features of claim 1 and by a method with a slide tool having the features of the independent claim 2.

The present invention is based on the general notion of deforming the flap of the first pot tooth space by means of the slide tool according to the invention by press-fitting. For this, the flap is pressed against the corresponding annular tooth in the radial direction by means of the slide tool according to the invention. Due to the twofold chamfering of the front of the extension section of the slide tool according to the invention with a first and a second chamfering angle, the flap is simultaneously also pressed positively in the axial direction into a recess in the annular tooth, and thus also deformed in the axial direction, by press-fitting the flap in the radial direction by means of the slide tool, since, due to the twofold chamfering, the extension section functions as a ramp, by means of which the flap can also be deformed in the axial direction. As a consequence of the axial deformation of the flap, the formation of a gap between the flap and the annular tooth is prevented by press-fitting.

Therefore, due to the entirely positive connection between the flap and the recess in the annular tooth, particularly good axial securing of the brake disc is achieved by means of the slide tool, with respect to the connection between the pot and the friction ring. Due to the optimised axial securing achieved in the brake disc according to the invention, additional measures, such as specific stampings or recesses in or on the pot or friction ring, are not required. This in turn has the consequence that the brake disc requires a reduced space requirement, in particular in the radial direction, to guarantee the axial securing, which reduces the required expansion of the brake disc, in particular in the radial direction. The space-saving formation of the brake disc additionally enables simplified cooling of the same.

In a preferred embodiment, the first chamfering angle is approximately 10° to 20°, preferably approximately 14°, and the second chamfering angle is 25° to 35°, preferably approximately 30°. In this way, a particularly effective press-fitting of the flap in the direction of the corresponding annular tooth is achieved positively by means of the slide tool, both in the radial and axial direction.

The invention furthermore relates to a method for the production of a brake disc having one or more of the aforementioned features, using a slide tool having one or more of the aforementioned features.

Further important features and advantages of the invention arise from the sub-claims, the figures and the corresponding description of the figures, using the drawings.

It is understood that the features that are cited above and are still to be illustrated below can not only be used in the respectively specified combination, but also in other combinations or individually, without exceeding the scope of the present invention.

Preferred exemplary embodiments of the invention are depicted in the figures and illustrated in greater detail in the description below, wherein the same reference numerals refer to the same or similar or functionally identical components.

Figure 2:
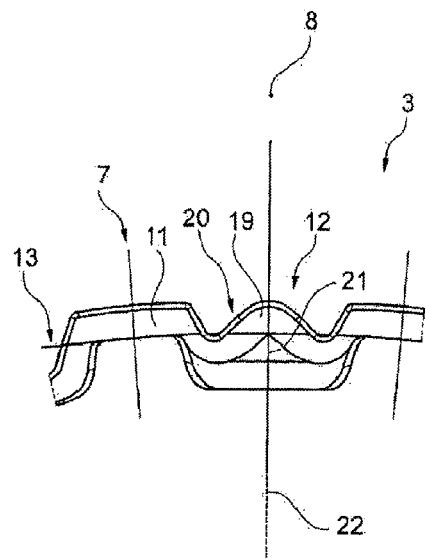
Figure 3:
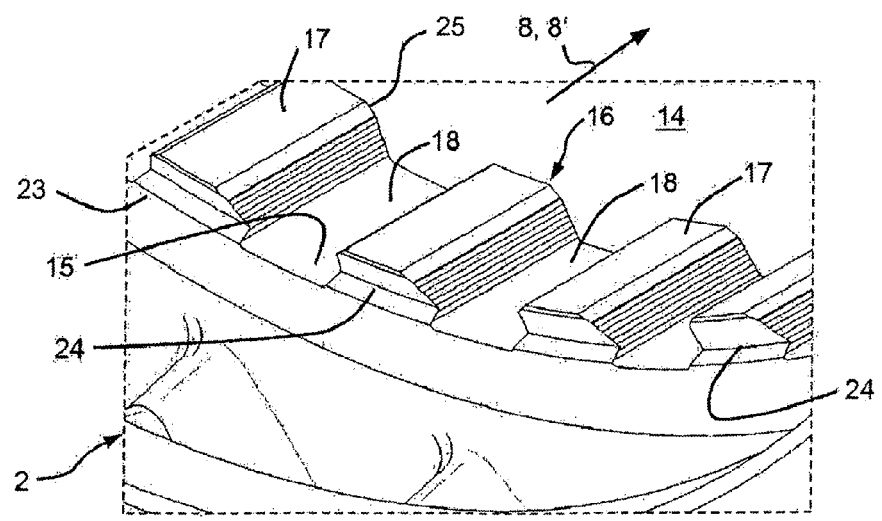
Figure 4:
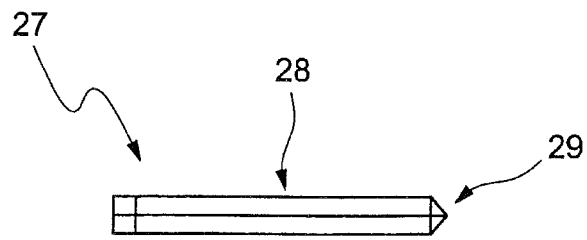
Figure 4:
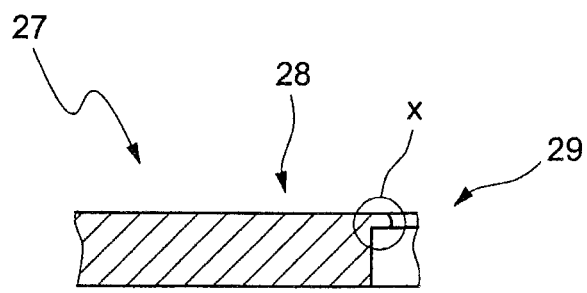
Figure 4:
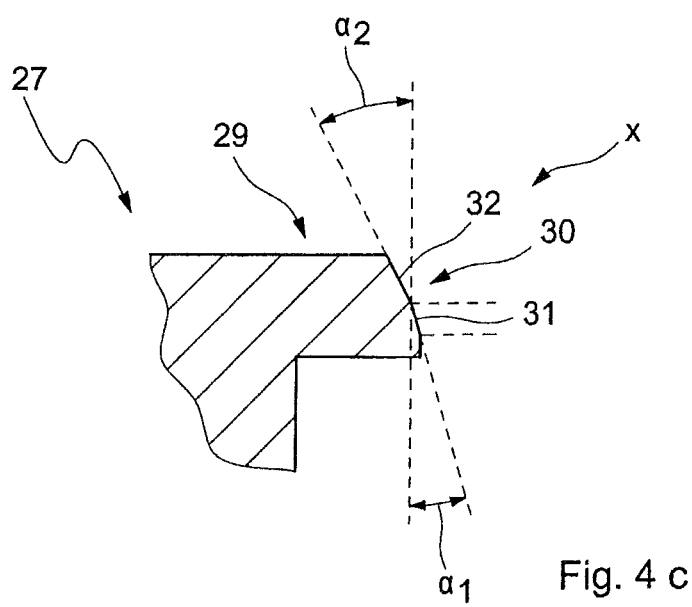
Figure 5:
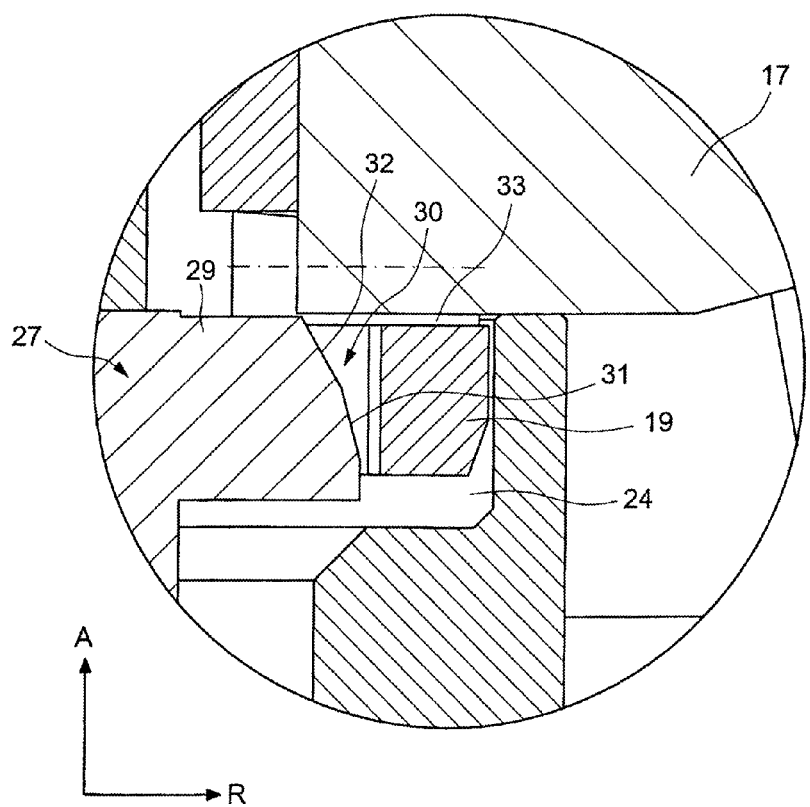

Here, schematic views of the following are depicted:

FIG. 1 an isometric depiction of the brake disc according to the invention,

FIG. 2 a section through a pot of the brake disc according to the invention, FIG. 3 an isometric view of a friction ring, FIGS. 4*a* to 4*c* a depiction of a first exemplary embodiment of a slide tool according to the invention, FIG. 5 a rough schematic depiction of the slide tool according to FIG. 4 when press-fitting a flap, FIGS. 6*a* to 6*c* a depiction of a second exemplary embodiment of a slide tool according to the invention.

According to FIG. 1, a brake disc 1 has a friction ring 2 and a pot 3. The pot 3 comprises a floor 4 as well as a wall 5 that projects from the floor 4 and runs in the peripheral direction. In addition, a pot gearing system 7 is moulded on an outer periphery 6 of the wall 5, wherein the pot gearing system 7 is configured as an axial gearing system and extends along the entire peripheral direction. The axial direction is denoted by arrows 8, or in FIG. 5 as A, and runs parallel to an axis of rotation of the brake disc 1. In addition, the floor 4 has screw holes, through which the pot 3 or the brake disc 1 can be fastened to a hub of a wheel carrier of a wheel suspension of a vehicle. Furthermore, the floor 4 has a central opening 10, which is arranged in the centre of the pot floor 4 and serves, for example, to centre the brake disc 1 on the hub. The pot gearing system 7 is formed by pot teeth 11 that protrude radially outwards, which are each spaced apart from one another by pot tooth spaces 12, 13 along the peripheral direction, wherein the pot teeth 11 have the same shape and size.

FIG. 3 shows the friction ring 2, which has a centrally-arranged opening 14. Thus, the friction ring 2 comprises the inner periphery 15 that encloses the opening 14, on which an annular gearing system 16 of the friction ring 2 is formed. The annular gearing system 16 is configured as an axial gearing system and comprises annular teeth 17 projecting radially inwards, which are each spaced apart from one another by an annular tooth gap 18 in the peripheral direction. The annular teeth 17 and the annular tooth gaps 18 each have the same shape and size. The pot gearing system 7 and the annular gearing system 16 are, in addition, designed to complement each other, such that a respective pot tooth 11 engages with an annular tooth gap 18 and an annular tooth 17 engages with a pot tooth space 12, 13. Anti-rotation is guaranteed by this engagement between the pot gearing system 7 and the annular gearing system 16, said anti-rotation enabling a transfer of a torsional moment between the pot 3 and the friction ring 2.

As can be seen in FIGS. 1 and 2, the pot gearing system 7 has first pot tooth spaces 12, on which a flap 19 is moulded. The flaps 19 of the pot tooth spaces 12 are formed by end sections 20 of the respective pot tooth space 12, said end sections 20 being cut free, with these pot tooth spaces 12 being formed from the remaining contour of the respective pot tooth space 12. The respective flap 19 is curved radially outwards, wherein a radius of curvature 21 of the curved flap 19 is selected in such a way that the flap 19 that curves radially outwards does not exceed an external radius 22 of the wall 5. Due to the curvature, the respective flap 19 is designed to be W-shaped when viewed axially, as in FIG. 2. The flap 19 that curves radially outwards is additionally formed in such a way that it radially overlaps the annular tooth 17, with which the corresponding pot tooth space 12 is in engagement, on a first axial end 23 that is facing away from the floor 4. The respective annular tooth 17 possesses, in the example shown, a recess 24 running axially in the peripheral direction on its first axial end 23, with which recess the flap 19 additionally engages axially. Thus, axial securing of the pot 3 relative to the friction ring 2 along a first axial direction 8' is guaranteed. In order to guarantee the axial securing in the other axial direction 8" as well, the pot gearing system 7 has second pot tooth spaces 13, which each comprises a projection 26 protruding radially outwards, which is arranged on a second axial end 25 of the respective second pot tooth space 13, with said end facing the floor 4. The respective projection 26 radially overlaps the annular tooth 17, which is in engagement with the corresponding pot tooth space 13, on the second axial end. With this, axial securing is also ensured in the second axial direction 8". For the assembly of pot 3 and friction ring 2, the exposed projections 26 serve as an axial stop, while the subsequently exposed flaps 19 cause the axial securing.

It is understood that the first radial end 23 and the second radial end 25, as well as the corresponding overlaps of the flaps 19 or the projections 26, can be exchanged. This means that the first axial end 23 can face the floor 4, while the second radial end 25 faces away from the floor 4.

The brake disc 1 is produced in such a way that first the pot 3, in which the flaps 19 are still not deformed, is inserted into the opening 14 of the friction ring 2, such that the pot 3 and the friction ring 2 are arranged concentrically and a respective pot tooth 11 engages with an annular tooth space 18, while an annular tooth 17 engages with a pot tooth space 12, 13. The projections 26 of the second pot tooth spaces 13 guarantee a corresponding axial arrangement of the pot 3 and the friction ring 2 and serve as an axial stop. Then the respective flap 19 is radially deformed, wherein this deformation takes place by press-fitting the flap 19.

Such a press-fitting of the flap 19 takes place according to the invention by means of a slide tool 27 shown in FIG. 4, which is depicted in FIG. 4a in a top view and in FIG. 4b in a longitudinal section view. The slide tool 27 has a main section 28 and an extension section 29 that is connected integrally to the main section. The extension section 29 is formed conically with respect to the top view according to FIG. 4a; in variants, however, other embodiments can also be envisaged.

The region of the extension section 29 (region X) designated with a cross X in FIG. 4b is depicted in enlarged form in FIG. 4c. As is shown in the enlarged depiction in FIG. 4c, a front 30 of the extension section has a twofold chamfering with two different chamfering angles. The first chamfering 31 here has a first chamfering angle $\alpha_1$ of 14°, and the second chamfering 32 has a chamfering angle $\alpha_2$ of 30°. In variants to the first exemplary embodiment, both chamfering angles can, however, have other values; for example, the first chamfering angle can lie in a range from approximately 10° to 20° and the second chamfering angle can lie in a range from approximately 25° to 35°. A particularly positive press-fitting of the flap 19 into a recess 24 in the annular tooth 17 takes place by means of the chamfering of the extension section 29 shown in FIG. 4c.

The radial deformation of the flap 19 is carried out by press-fitting by means of the slide tool 27 according to the invention in such a way that, after the press-fitting, the respective flap 19 overlaps the corresponding annular tooth 17 on at least one axial end 23, 25, here on the first axial end 23. At the same time, the region overlapping the annular tooth 17 of the respective flap 19, which is deformed radially outwardly, is impressed axially into the corresponding recess 24 on the first axial end 23 of the annular tooth 17. Thus, the friction ring 2 is secured relative to the pot 3 in both axial directions 8', 8".

The radial deformation of the flap 19 by means of the slide tool 27 is depicted in FIG. 5 in a rough schematic view. By moving the slide tool 27 in a radial direction R, the extension section 29 also pushes against the flap 19 in the radial direction R, such that this is first deformed in the radial direction R. Due to the first and second chamfering 31, 32 of the front 30 of the extension section 29, the movement of the slide tool 27 in the direction R simultaneously also effects and supports a deformation of the flap 19 in an axial direction A. In this way, it is achieved that the flap 19 is pressed positively into the recess 24 of the annular tooth 17. It is thus ensured that a gap 33, which potentially forms during the press-fitting of the flap 19, and which typically has a diameter of up to 0.2 mm, does not remain between the flap 19 and the recess 24 of the annular tooth 17, but rather the annular tooth 17 is also pressed against the recess in an axially positive manner. This leads to improved axial securing between the friction ring 2 and the pot 3 of the brake disc.

Figure 6:
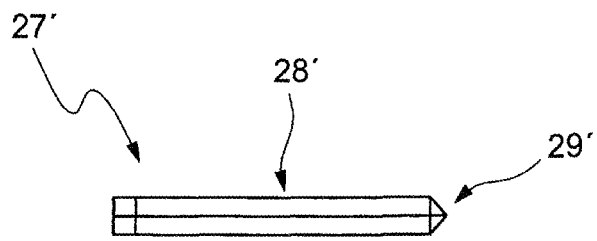
Figure 6:
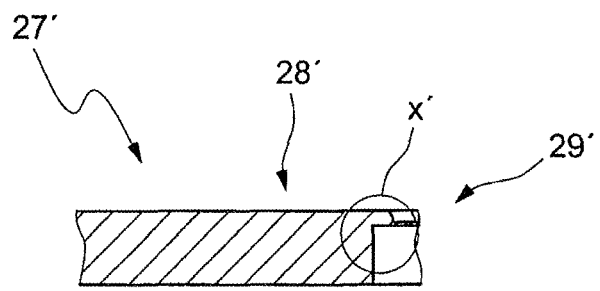
Figure 6:
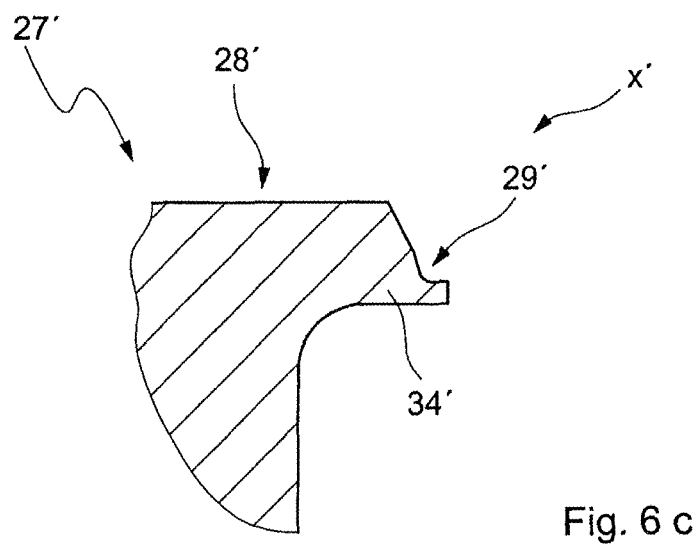

In FIG. 6, a second exemplary embodiment of a slide tool 27' according to the invention is shown. According to FIG. 4, FIG. 6a also shows a top view and FIG. 6b shows a longitudinal section view of the slide tool 27'. FIG. 6c shows the region X' of FIG. 6b in an enlarged depiction.

The slide tool 27' differs from the slide tool 27 according to the first exemplary embodiment in that the extension section 29' is connected to the main section 28' of the slide tool 27' by means of a collar 34'. The main section 28', collar 34' and extension section 29' can thus be formed in unity. In a variant to the second exemplary embodiment, it can be considered that the extension section 29' and/or collar 34' each be formed as separate entities that are connected to each other.

During the press-fitting of the flap 19 (cf. FIG. 5), an ejection of flap material is prevented by means of the collar 34' if the flap 19 is deformed in both the radial and axial direction. In this way, an even greater level of deformation of the flap 19 in the axial direction A is enabled. In particular, it is also possible, in this way, to reduce a gap, which has a diameter of greater than 0.2 mm, by axial deformation of the flap 19 to 0 mm, such that, in this case, a positive pressing of the flap 19 onto the recess 24 of the annular tooth 17 is also possible.

The invention claimed is:

1. A method for the production of a brake disc (1) of a motor vehicle, having a pot (3) or wheel flange, which has a floor (4) and a wall (5) that protrudes from and encloses the floor, and having a friction ring (2), which has an opening (14) in which the wall (5) is arranged, wherein the pot (3) and the friction ring (2) are arranged concentrically, the wall (5) has an axial pot gearing system (7) running along an outer periphery (6), having pot teeth (11) protruding radially outwards, a respective pot tooth space (12, 13) is arranged in the peripheral direction between adjacent pot teeth (11), the friction ring (2) has an axial annular gearing system (16) running along an inner periphery (15), said system being designed to complement the pot gearing system (7) and having annular teeth (17) protruding radially inwards, wherein a respective annular tooth gap (18) is arranged in the peripheral direction between adjacent annular teeth (17), the pot teeth (11) engage with the annular tooth gaps (18), the annular teeth (17) engage with the pot tooth spaces (12, 13), a flap (19) is formed on at least one first pot tooth space (12), said flap protruding radially outwards and radially overlapping the respective annular tooth (17), which engages with this pot tooth space (12), on a first axial end (23, 25), and wherein the flap (19) is held positively on a recess (24) of the annular tooth (17) in the axial direction (A) without formation of a gap (33), by using a slide tool (27; 27') comprising a main section (28, 28') and an extension section (29; 29') arranged on the main section (28, 28'), wherein a front (30) of the extension section (29; 29') has a twofold chamfering (31, 31'; 32, 32') having a first chamfering angle ($\alpha 1$) and a second chamfering angle ($\alpha 2$), and wherein the pot (3) or wheel flange is inserted into the opening (14) of the friction ring (2) in such a way that a respective pot tooth space (12, 13) and an annular tooth (17), as well as an annular tooth gap (18) and a pot tooth (11), engage with one another, wherein the respective flap (19) of the first pot tooth space (12) is radially deformed by press-fitting by means of the slide tool (27; 27') in the direction (R) of the corresponding first annular tooth (17) at least in certain regions, such that the respective flap (19) is pressed into a recess (24) of the corresponding annular tooth (17) due to the twofold chamfering (31, 32) of the slide tool (27; 27') in the axial direction (A), in such a way that the flap (19) is pressed positively into the recess (24) in the axial direction without a gap (33) forming, wherein the press-fitting of the flap (19) in the radial direction by means of the slide tool (27, 27') also simultaneously presses the flap (19) positively in the axial direction (A) into a recess in the annular tooth (17).

2. A method according to claim 1, wherein a slide tool (27; 27') is used, wherein the first chamfering angle ($\alpha 1$) is approximately 10° to 20°, and/or the second chamfering angle ($\alpha 2$) is approximately 25° to 35°.

\* \* \* \* \*